Oct. 31, 1961  S. H. M. DODINGTON  3,007,159
IMPULSE REPEATER SYSTEMS
Filed Aug. 28, 1944  3 Sheets-Sheet 1

INVENTOR.
SVEN H. M. DODINGTON
BY
ATTORNEY

Oct. 31, 1961     S. H. M. DODINGTON     3,007,159
IMPULSE REPEATER SYSTEMS
Filed Aug. 28, 1944     3 Sheets-Sheet 3
Fig. 4.
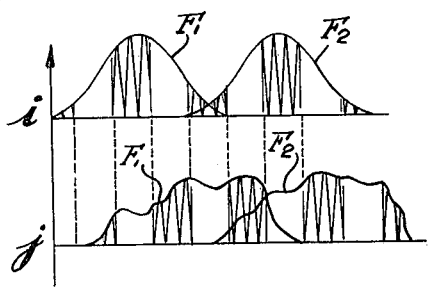
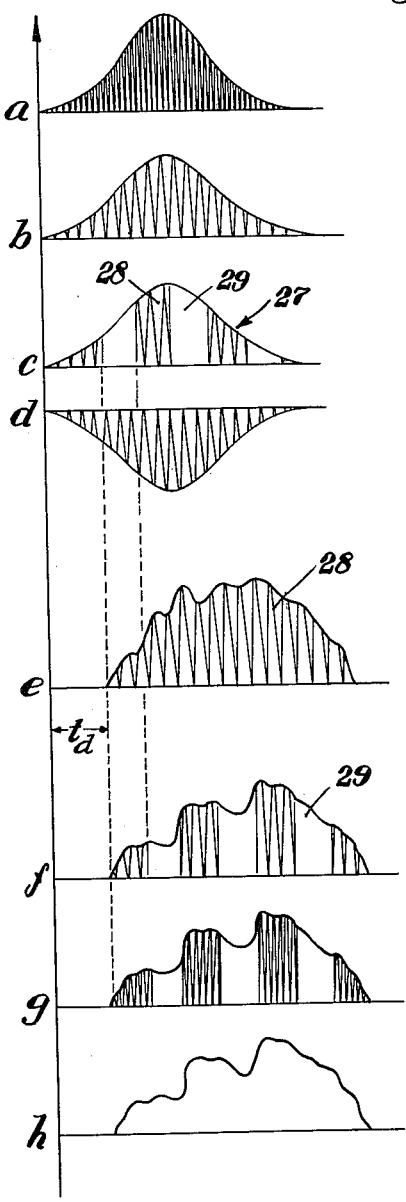
INVENTOR.
SVEN H. M. DODINGTON
BY
ATTORNEY

United States Patent Office 3,007,159
Patented Oct. 31, 1961

3,007,159
IMPULSE REPEATER SYSTEMS
Sven H. M. Dodington, Forest Hills, N.Y., assignor to International Telephone and Telegraph Corporation, a corporation of Maryland
Filed Aug. 28, 1944, Ser. No. 551,471
12 Claims. (Cl. 343—18)

This invention relates to radio repeaters and more particularly to a system for intercepting radio impulses or waves transmitted by one or more radio locating systems and for transmitting in response thereto, simulated reflections of obstacles such as aircraft and ships.

Heretofore pulse repeating and reflection falsifying systems have been disclosed which operate, in response to the reception of impulses or waves transmitted by a radio locating system, to transmit return pulses or waves of such strength and time retardation as to simulate one or more ships or aircraft at some selected distance from the radio locating system. These systems are particularly useful in warfare to mislead and confuse the operators of enemy radio locating systems.

It is one of the objects of my present invention to improve upon the reflection falsifying systems of the aforementioned systems by providing a system capable of producing falsifying signals closely simulating the reflections that might be expected of a convoy or squadron of ships or aircraft.

Another object of the invention is to provide a method and means for producing in response to the reception of radio impulses a composite pulse signal simulating the reflection of a group of reflecting obstacles, and to effect substantially continuous change in the signal to further simulate change in the position of the obstacles as might occur during maneuvering of ships or during flight of a squadron of aircraft.

Another object of the invention is to provide a signal pulse repeater system with means for obtaining delay and pulse multiplication in response to impulses received from a plurality of different sources.

A further object of the invention is to provide a repeater system which may successfully provide echoes particularly in response to a plurality of radio locating systems which may be received simultaneously in overlapping relation or in close succession.

In accordance with my invention, I provide a pulse repeating system comprised of a receiver for accepting the incoming high frequency carrier impulse signal and equipped with means for heterodyning the carrier of the impulses with a locally produced oscillation to produce an output of impulses, having an intermediate frequency carrier, which are suitably amplified. A chain of pulses is obtained responsive to each impulse, which chain of pulses is then delayed with respect to the incoming signal, and subsequently retransmitted after heterodyning the above-mentioned intermediate frequency carrier with the same locally produced oscillation in order to obtain the same outgoing carrier frequency as that of the incoming signal.

For obtaining the delay and multiplication of the response pulses, the incoming pulses are applied to a quartz crystal, having a natural frequency which is a given fraction of the intermediate carrier frequency, and being sufficiently damped to cover a required band width. The incoming pulse forces the crystal into oscillation at the frequency of the pulse and sets up a wave train in a liquid in which the crystal is immersed and through which the wave train is propagated at the speed of sound. A number of pulse reflecting surfaces are positioned opposite the crystal within the liquid and in the line of travel of the waves set up by the crystal. The wave train emanating from the crystal is reflected toward the crystal from each of the surfaces at the far end of the liquid bath as a wave combining the reflections of all the surfaces, striking the crystal and inducing a voltage therein. This voltage will, in the main, have a composition related to the original voltage impulse applied to the crystal, a few microseconds before, and modified by the number and type of reflecting surfaces used. A whole chain of pulses in response to each of the impulses applied may thus be obtained.

In order to be able to preserve the similitude of the combined echo or repeat pulse which may be obtained from repeater systems of the type discussed for indicating one or a group of obstacles, as compared with a true echo, while handling a plurality of sources of radio location impulses, the present invention contemplates chopping up or blanking for short intervals at a comparatively very rapid rate the impulses as they are being received resulting in pulses comprised of sub-pulses and blanked-out portions of very short duration. Just before the echo or repeat pulses are transmitted, they are subjected to the same chopping up or blanking operation as the impulses received at the receiving end, except that the phase of the sub-pulses at the transmitting end is such that the receiver is blanked out while the transmitter is working, and vice versa. This chopping up of the pulses while being received and transmitted, or alternate keying of the receiver and transmitter portions of the system, permits of a plurality of impulse sources to be handled by the same repeater system even though these may come in at various frequencies and may overlap in the timing of the impulses as will appear hereinafter.

In order to cause the pulse repeating system to appear even more natural in its effect, the so-called "breathing effect," or undulations in the echo or repeat pulses which are different for different pulses and which is characteristic of indications of moving obstacles such as a squadron of ships or aircraft, may be achieved in this instance by means of variation in the length of the path of propagation through the liquid, or by alternative methods having a similar effect. I may also provide a non-mechanical alternative for obtaining the "breathing effect" by continually changing the locally produced beat frequency in a given slow rhythm which when combined with the fixed input and output frequencies of the carrier wave of the incoming impulses and of the outgoing repeat pulses results in a "breathing" or undulating pattern in the wave shape of the repeat pulses.

The above and other features and objects of the invention will become clearer upon consideration of the following detailed description to be read in connection with the accompanying drawings, in which:

FIG. 4 is a graphical representation of the operation of the repeater system of FIG. 2 in response to one or more incoming impulses.

Figure 1:
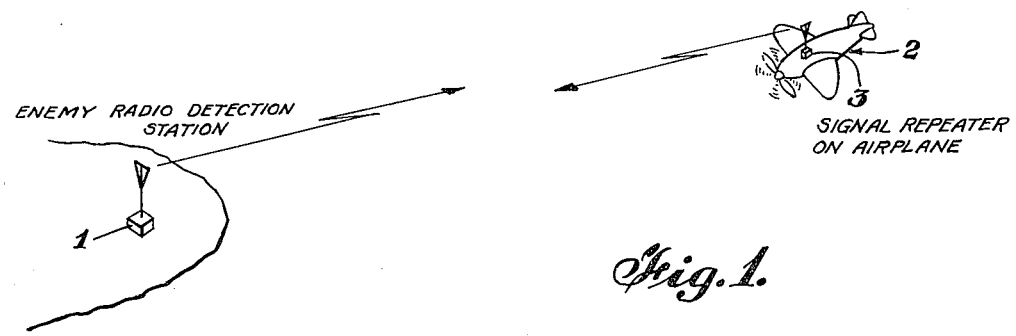
FIG. 1 is a schematic diagram showing one of the uses of the invention.

One of the uses of this invention is shown in FIG. 1. Assume, for example, that the enemy has a radio locating system as indicated at 1 for transmitting impulses and for receiving and indicating reflections of obstacles such as ships and aircraft. Such systems include means to determine elevation, azimuth and distance of the reflecting obstacle. According to the principles of this invention a single airplane 2 may be provided with a radio repeater system 3 of the character described in detail hereinafter which is capable of detecting radio impulses and to transmit in response thereto composite pulse signals simulating the reflections of a squadron of airplanes in flight. The radio repeater system, of course, may be carried by a small boat or otherwise be strategically located to simulate the reflection of a convoy, squadron of warships or a group of other reflecting obstacles and thereby deceive and confuse the enemy. The composite pulse signal preferably is made to constantly vary in its appearance so as to indicate realistically the reflection of a group of obstacles in motion. In place of the single impulse transmitter and receiver system 1, there may be a plurality of systems operating simultaneously, overlapping in their timing and each having a somewhat different pulse repetition rate and carrier frequency.

Figure 2:
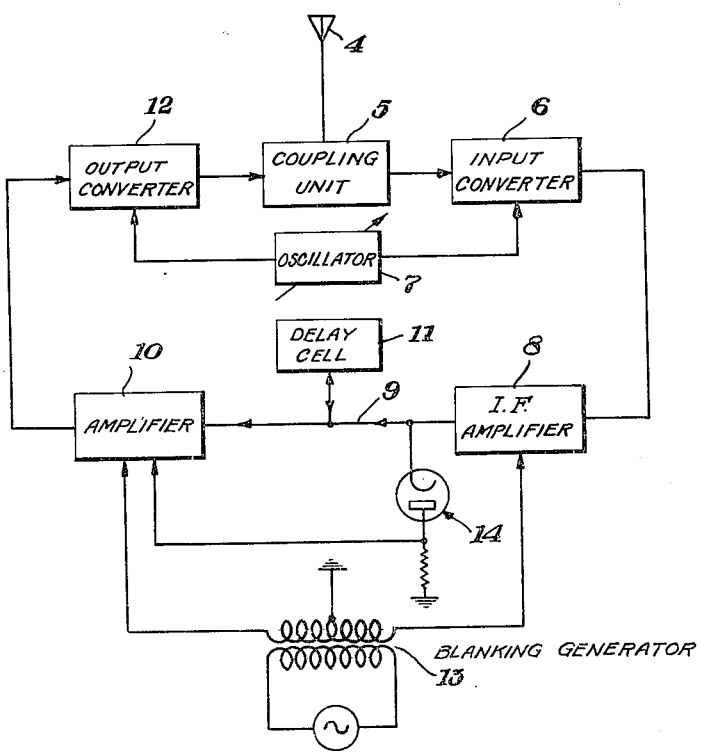
FIG. 2 is a schematic block diagram of a repeater system according to the principles of the invention.

The block diagram of FIG. 2 shows schematically the parts of the radio repeater system of the invention. A two-way antenna 4 is connected to a transmitter-receiver comprised of a coupling unit 5 which is connected to an input converter 6 wherein the radio frequency or ultra high frequency of the carrier of the incoming impulse waves is converted to a suitable intermediate frequency by being heterodyned against the output of a local beat frequency oscillator 7 for application to a wide band I.F. amplifier stage 8.

Connected to the output 9 of the I.F. stage 8 is an amplifier 10, wherein impulse energy from the stage 8 which has been modified into delayed and multiplied response or repeat pulse energy in a delay device 11 coupled to the output connection 9, is amplified and fed to an output converter 12, adapted to reconvert the pulse carrier to the original high frequency of the carrier of the incoming pulse through coaction with the oscillator 7. The converter in turn is connected to the coupling unit 5 supplying the antenna 4 now acting as a transmission antenna. A high frequency blanking or keying generator 13 is connected both to the input and to the output amplifiers 8 and 10 for the control thereof, so that the receiving and transmitting functions of the apparatus do not overlap, by chopping up or keying in and out for short intervals the incoming and outgoing pulses, as will be explained hereinafter.

Figure 3:
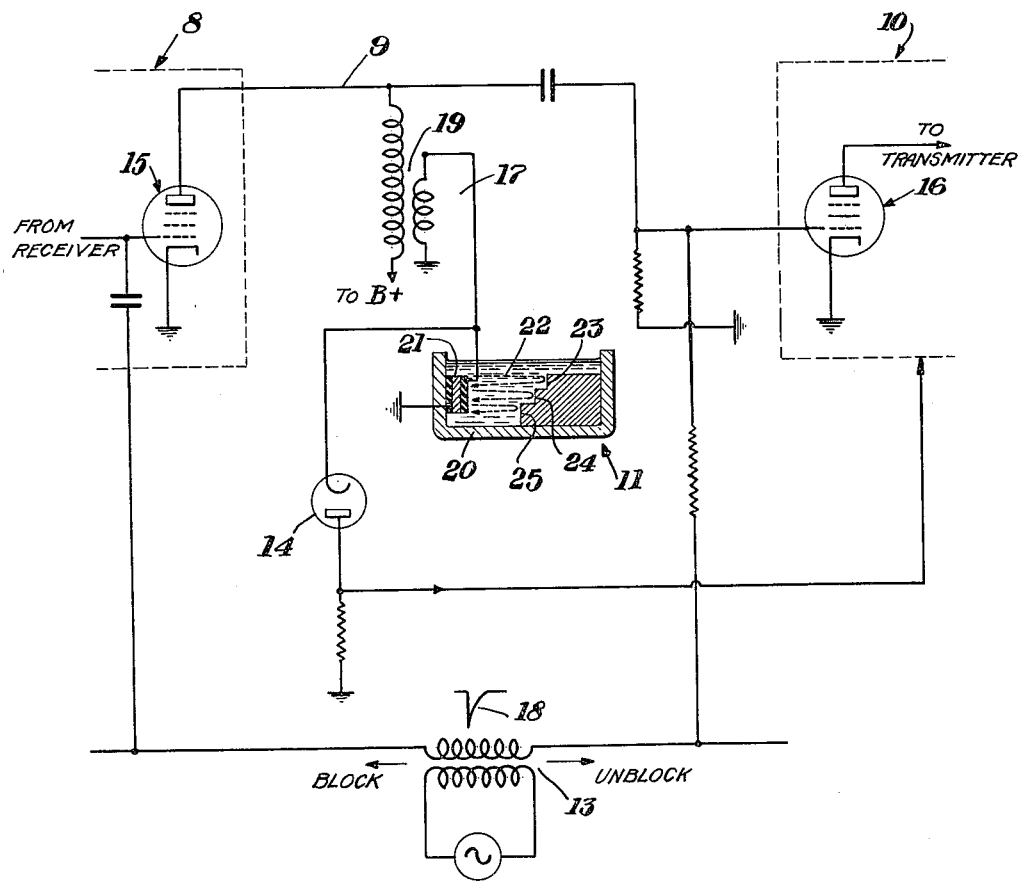
FIG. 3 is a schematic representation of a part of the circuit of FIG. 2 with the device for obtaining the repeat or echo pulses shown in detail.

In order to avoid sending out the original incoming impulse, that portion of the energy wave in the amplifier 10 representing the orignial impulse may be effectively eliminated by means of an equal and opposite pulse supplied to the outgoing amplifier 10 by the rectifier 14 as will become apparent with the description of FIG. 3.

In the quasi-schematic diagram of FIG. 3 certain elements which have already been described in connection with FIG. 2 will be recognized, such as the receiving amplifier 8, the transmitting amplifier 10, the delay device 11, the blanking or keying generator 13 and the rectifier 14. It will be noted that the generator 13 supplies a blocking voltage to the receiving amplifier 8 as represented by pentode 15, to the control grid of which the blocking signal is supplied, while at the same time an unblocking signal from the other side of the generator 13 is applied to the control grid of pentode 16 representing the transmitter amplifier 10.

As already indicated in FIG. 2 amplifiers 8 and 10 are connected by the connection 9 whereby the impulse voltage from the receiving amplifier 8 is supplied to the transmitting amplifier 10. Inductively coupled at 19 to the connection 9, is an inductive circuit 17 which serves as a coupling between the connection 9 and the delay device 11. The circuit 17 also acts as a coupling means between connection 9 and the rectifier 14 which acts to demodulate the impulse originally received through the antenna 4. The function of the rectifier, the polarity connection of which, as shown, is significant, is to transmit the original impulse, suitably demodulated and inverted in phase, as at 18, to the transmitting amplifier, so as to cancel out the impulse in the transmitter, supplied to it over connection 9, as being undesirable.

The delay device itself comprises a container 20 in which there is positioned a piezo-electric type quartz crystal 21 immersed in a liquid indicated at 22. At the far end of the container 20 a number of reflecting surfaces 23, 24 and 25 are combined in a spingle reflecting block.

The method of obtaining one or more composite repeat or echo pulses which are suitably delayed in response to the incoming impulses and the proper keying or blanking thereof will now be described in connection with FIG. 4.

The incoming impulses may originate from one or a plurality of sources, the carrier frequency of which may vary from one source to the other. A representative impulse is indicated in graph $a$. The carrier wave of the impulse, as it is applied to the input converter 6, is combined with the output of the local oscillator 7. The resulting beat frequency between the oscillator and the incoming signal (graph $a$) appears in the output connection of the input converter in the form shown in graph $b$, the difference in the H.F. and the I.F. of the impulse carrier being apparent (the radio frequency may be of the order of 45 mc., while the intermediate frequency comes to $45 \pm 8$ mc.). As the impulse at the I.F. is being amplified in the amplifier 8, a keying or blanking and unblanking voltage is supplied from the generator 13 to the amplifier 10, as shown in detail in FIG. 3 (the rate of keying is preferably at a frequency of 2 to 5 mc.). The effect of the alternately keying on and off of the input amplifier results in a pulse having the shape as at 27, graph $c$. That is, it is chopped up into a series of short sub-pulses 28 having an I.F. carrier wave, and separated by blanked out intervals 29. The showing in graph $c$ is an approximation as it would appear on an oscilloscope screen. Theoretically the pulse 27 woud be interrupted at the keying frequency of 2 to 5 mc. After assuming the form as in graph $c$, the chopped up impulse is applied to excite the quartz crystal 21 (FIG. 3). The natural frequency of the crystal may be, for instance, $\frac{1}{3}$ that of the I.F. and the crystal may be sufficiently damped to cover the required band width. The incoming impulse forces the crystal into mechanical vibration at the pulse frequency and sets up a supersonic wave train in the liquid which travels therethrough at the speed of sound. This wave train is reflected from the surfaces 23, 24 and 25 and, on returning through the liquid, strikes the crystal and induces therein a series of weak but complex pulses which, for each reflecting surface, will have substantially the wave shape as the voltage applied to the crystal by the incoming pulse, but separated therefrom in time by a few microseconds representing the travel time of the pulse wave between the reflecting surfaces and the crystal. The reflections combine to form the composite wave shape shown in graph $e$, the delay due to the time of travel from the crystal to the surfaces and back being indicated by the interval $t_d$. It is obvious, of course, that the reflecting surfaces may be varied in respect to their number and spacing so that various types of composite wave shapes may be obtained. The complex signal thus obtained will be quite similar in shape to that produced by a radio locator pulse striking a formation of aircraft or similar obstacles. That portion of the wave representing the original impulse, as already pointed out before, may be eliminated by the application to the amplifier 10 of an equal and opposite voltage obtainable from the rectifier 14 and represented in graph $d$, which is also shown at 18, in FIG. 3. Unless eliminated, the original pulse would be retransmitted with the composite repeat or echo wave, approximately taking up the position of $t_d$ in graph $e$. It is to be understood, of course, that in place of the rectifier shown, other methods may be employed for accomplishing the same end, that is, demodulation of the original impulse.

In graph $f$, the effect of the blanking or keying generator on the composite or simulated reflection pulse 28 is illustrated at 29, where sub-pulses made up of the I.F. carrier alternate with blanked out portions similar to the keying effect on the impulse in graph c. The phase of application of this keying, chopping or blanking voltage to the receiving and to the transmitting portions of the system is so adjusted that the receiver is keyed out whenever the transmitter is keyed in, and vice versa, many times during any one incoming or outgoing pulse wave. This effect may be traced by means of the broken lines connecting the respective portions of pulses 27 and 29. The representation of the chopped up pulses of graphs c and f is exaggerated, and in actuality, under the usual oscilloscope screen sweep timing conditions, could be observed only as a blurring of the space delimited by the wave envelope, which is why the wave envelopes have been diagrammed in full rather than only in those time intervals wherein the wave is unblanked.

After receiving suitable amplification in the output amplifier 10, the repeat pulse wave shown in graph f, is applied to the converter 12, where, by heterodyning with the oscillator 7, the I.F. carrier frequency is converted back to the original R.F. value, as illustrated in graph g. Graph h shows the appearance of the simulated reflection or echo pulse as it is finally received by an enemy observer.

Graph i illustrates the relation between two overlapping impulses which may have the carrier and/or repetition frequencies $F_1$ and $F_2$, and which are transmitted as simulated reflections in the form shown in graph j. Since the keying or blanking of the receiver and transmitter is entirely independent of the incoming signal, no "threshold" value need be observed below which the repeater will not operate, as would be the case in circuits employing signal operated keying. Furthermore, no possibility exists of missing any of the incoming pulses, so that all pulses, including those arriving simultaneously or in overlapping form may be repeated and properly responded to. Delays between the incoming and responding pulses may be made very short so that retransmission may commence even before the incoming impulses have been completely received. (Graphs e, j.)

It will be seen, therefore, that simulating pulse echo apparatus of the type described herein is well suited for the reception and the response to a relatively large number of radio location systems as well as to a single impulse source. The chances of detection of the deception practiced on the enemy, which would be probable if over 5% of the incoming pulses were to be missed, is considerably decreased accordingly.

Assuming, for instance, that a simulated "five mile raid" is to be produced, the minimum blocking time in a repeater will be of the order of 50 microseconds. If it is assumed that the radio location pulse repetition frequency is 1,000 and that the various location systems do not have exactly synchronized repetition rates, it would appear that with the ordinary alternate keying system not more than 3 or 4 such radio locators can be simultaneously repeated without the possibility of exceeding the missed pulse tolerance of 5%. Therefore, when employing the present method, the danger of the enemy detecting the deception when using, say, 10 or more of the radio locators becomes quite small.

The delay of the pulses in the liquid of the delay device 11 depends on the velocity of sound for the particular liquid chosen, water, for instance, giving a delay of about 7 microseconds per centimeter. Most other liquids will give a slightly greater delay. In this particular instance, and for the application suggested, a liquid having a low freezing point and whose attenuation of the wave train is relatively high, should be chosen. The liquid should also be non-flammable.

In addition to generating the complex wave form in response to the incoming signal, it is also possible to obtain a random variation of the repeat pulse wave form to simulate the so-called "breathing" in radio location system reflection. One such possibility may be found in the propagation characteristics of the liquid medium which may be varied by the application of heat by means of a heating element, in contact with the liquid (not shown) which may be one of many possible forms, such as a heating coil in the liquid or other similar forms. The resulting temperature gradient through the liquid produces a relatively substantial random change in velocity of propagation in different parts of the liquid, due to the random nature of the convection currents resulting in greater and lesser delay in the propagation of the pulses traveling from and to the crystal. The envelope of the complex wave consequently is made to undulate and breathe in a manner not unlike a true radio locator reflection from a squadron of ships or aircraft in motion. Still another method for simulating the "breathing" effect is suggested in FIG. 2 where the local beat frequency oscillator is shown to be variable, thus producing with the incoming impulses, an intermediate frequency impulse which slowly varies in the wave shape in accordance with the rhythm of variation in the frequency of the local oscillator.

In view of the fact that crystal harmonics necessitate a very large amount of amplification, it is necessary to use crystals at the highest possible frequency consistent with reliability. Since the supersonic frequency applied to the crystal in this case is effective in producing a wave having a length measured in a few hundredths of a millimeter in most liquids and only somewhat larger in most metals, reflecting systems to modify the response within a useful band must, therefore, exhibit accuracies of a fraction of the wave length in liquids. The choice, therefore, was made to load the crystal with only the liquid, and to employ several crystals to cover the requisite band, using electrical circuits to compensate for inequalities between crystals.

From the foregoing, it will be clear that according to the principles of my invention it is possible now to produce simulated reflections closely approximating the characteristics of reflections that might be expected of a single or a given group of obstacles, such as a single plane or a squadron of aircraft, or a single or a plurality of ships, in response to impulses from a relatively large number of radio locating systems set forth hereinabove.

While I have shown and described the principles of my invention in connection with specific apparatus, it will be understood that the method of producing a simulated echo signal in response to a plurality of radio location systems may be performed by other apparatus as well. It will be understood, therefore, that the specific apparatus herein shown and described, is to be regarded as illustrative of the invention only and not as limiting the scope of the invention as set forth in the objects and the appended claims.

I claim:

1. The method of simulating in response to a train of radio impulses on a given carrier frequency the reflections that would be produced by a given reflecting obstacle, comprising receiving said impulses and converting said impulses to a certain frequency, keying said converted impulses at a high rate to produce composite impulses comprised of sub-impulses separated by blanked intervals of short duration, producing at least one repeat impulse on the carrier of said certain frequency for each of said composite impulses, keying said repeat impulses to produce repeat sub-impulses to occur during said blanked intervals, converting said repeat impulses to said given frequency, and transmitting the resulting repeat impulses to produce signals having characteristics simulating those which would be present in impulses reflected from said obstacle.

2. The method of simulating in response to a train of radio impulses the reflections that would be produced by a given reflecting obstacle comprising receiving said impulses on a given carrier frequency, converting said impulses to a certain frequency, keying said impulses at a high rate to produce composite impulses comprised of sub-pulses separated by intervals of short duration, producing at least one repeat impulse on the carrier of said certain frequency for each of said composite impulses, delaying said repeat impulses by a given time interval, keying said repeat impulses to produce repeat sub-impulses separated by intervals at the same rate as the first mentioned keying but in alternate manner whereby said repeat sub-impulses occur coincidentally with the intervals between said sub-impulses produced from the received impulses, converting said repeat impulses to said given frequency and transmitting the resulting repeat impulse.

3. The method of simulating in response to at least one train of radio impulses formed of a radio frequency carrier wave the reflections that would be produced by a given reflecting obstacle, comprising receiving said impulses, converting the carrier wave of said impulses to a supersonic frequency, keying said impulses at a high rate to produce composite impulses comprised of sub-impulses and blanked out portions of very short duration, producing at least one repeat pulse for each of said composite impulses, delaying said repeat impulses by a given time interval, keying said repeat pulses to produce composite repeat impulses comprised of repeat sub-impulses and blanked out portions occurring at the same rate as said sub-impulses and having a phase relationship whereby said repeat sub-impulses occur coincidentally with the blanked out portions of said received impulses, converting the carrier wave of said repeat impulses to the radio frequency of the carrier wave of said received impulses, and transmitting the resulting repeat impulse energy.

4. The method of simulating in response to a train of radio impulses formed of a radio frequency carrier wave the reflections that would be produced by a given reflecting obstacle, comprising receiving said impulses, converting the carrier wave of said impulses to a supersonic frequency, keying said converted impulses at a high rate to produce composite impulses comprised of sub-impulses on said supersonic frequency and blanked out portions of very short duration, producing a plurality of repeat impulses for each of said composite impulses, delaying said repeat impulses by a given time interval, keying said repeat impulses to produce composite repeat pulses comprised of repeat sub-impulses and blanked out portions occurring at the same rate as said received sub-impulses on said supersonic frequency and having a phase relationship whereby said repeat sub-impulses occur coincidentally with the blanked out portions of said received impulses on said supersonic frequency, converting the carrier wave of said repeat impulses to the radio frequency of the carrier wave of said received impulses, and transmitting the resulting repeat impulse energy.

5. The method of simulating in response to a train of radio impulses formed of a radio frequency carrier wave the reflections that would be produced by a given reflecting obstacle, comprising receiving said impulses, converting the carrier wave of said converted impulses to a supersonic frequency, keying said converted impulses at a high rate to produce composite impulses comprised of sub-impulses and blanked out portions of very short duration, producing at least one repeat impulse for each of said composite impulses, delaying said repeat impulses by a given time interval, imparting a low frequency random variation to the wave shape of said repeat impulses, keying said repeat pulses to produce composite repeat impulses comprised of sub-impulses and blanked out portions occurring at the same rate as said sub-impulses produced from said received impulses and having a phase relationship whereby said repeat sub-impulses occur coincidentally with the blanked out portions of said sub-impulses produced from said received impulses, converting the carrier wave of said repeat impulses to the radio frequency of the carrier wave of said received impulses, and transmitting the resulting repeat impulse energy.

6. The method of simulating in response to a train of radio impulses on a given carrier frequency the reflections that would be produced by a given reflecting obstacle comprising receiving said impulses, converting the carrier frequency of said impulses to a certain frequency, keying said converted impulses at a high rate to produce composite impulses comprised of sub-impulses and blanked out portions of very short duration, producing at least one repeat impulse for each of said composite impulses, delaying said repeat impulses by a given time interval, keying said repeat impulses to produce repeat sub-impulses and blanked out portions occurring at the same rate as said sub-impulses and having a phase relation whereby said repeat sub-impulses occur coincidentally with the blanked out portions of said impulses, eliminating from the resulting wave form that portion corresponding to the original impulse, converting said repeat sub-impulses to said given carrier frequency, and transmitting the resulting repeat impulses.

7. The method of simulating in response to a train of radio impulses on a given carrier frequency the reflections that would be produced by a given reflecting obstacle comprising receiving said impulses, converting the carrier frequency of said impulses to said given frequency, producing at least one repeat impulse for each of said radio impulses, delaying said repeat impulses by a given time interval, keying said converted impulses and said repeat impulses to produce composite impulses and repeat pulses comprised of sub-impulses and blanked out portions occurring at a relatively high rate and having a phase relationship whereby said repeat sub-impulses occur coincidentally with the blanked out portions of said converted impulses, converting the carrier frequency of said repeat sub-impulses to said given carrier frequency and transmitting the resulting repeat impulse energy.

8. A system for simulating in response to a train of radio impulses formed of a radio frequency carrier frequency wave the reflections that would be produced by a given reflecting obstacle comprising means for receiving said impulses, means for converting said radio frequency carrier to a supersonic frequency, means for producing at least one repeat impulse for each of the impulses, means for transmitting the resulting repeat impulse, and means for alternate keying of said converted impulses and said repeat impulses for producing sub-impulses and blanked out portions therein, whereby overlapping signals may be received and transmitted.

9. A system for simulating in response to a train of radio impulses formed of a radio frequency carrier the reflections that would be produced by a given reflecting obstacle comprising means for receiving said impulses, means for producing a plurality of repeat impulses for each of said impulses, means for transmitting the resulting repeat impulses, means for converting said radio frequency carrier to a supersonic frequency and to reconvert it to said radio frequency operatively connected to said means for receiving and said means for transmitting, and means for alternate high frequency keying of said impulses and said repeat impulses for producing sub-impulses and blanked out portions therein, connected to said means for receiving and said means for transmitting, whereby overlapping signals may be received and transmitted.

10. A system for simulating in response to a train of radio impulses formed of a radio frequency carrier the reflections that would be produced by a given reflecting obstacle, comprising, in a circuit, means for receiving said impulses, means for converting the radio frequency carrier of said impulses to a supersonic frequency, an impulse amplifier, means for producing a plurality of repeat impulses from each of said impulses, means for delaying said repeat impulses, an amplifier for said repeat impulses, means for cancelling out said original impulse in said second named amplifier, means for high frequency alternate keying of said impulses and said repeat impulses including a high frequency blanking voltage generator operatively connected to said first and said second named amplifiers, means for converting said carrier at the supersonic frequency to the radio frequency of said impulses associated with said repeat impulse amplifier, a beat frequency oscillator connected to both said converting means, and means for transmitting said repeat impulses in common with said means for receiving.

11. A system for simulating in response to at least one train of radio impulses the reflections that would be produced by a given reflecting obstacle, comprising means for receiving said impulses, means for producing at least one repeat impulse for each of said received impulses, means for transmitting the resulting repeat impulses to produce signals simulating characteristics which would be present in impulses reflected from said obstacle, keying means, means controlled by said keying means to produce from said received impulses sub-impulses with intervals therebetween, and means also controlled by said keying means to produce from said repeat impulses, sub-impulses occurring during the intervals between the sub-impulses produced from said received impulses.

12. A system for simulating in response to a train of radio impulses on a given carrier frequency the reflections that would be produced by a given reflecting obstacle comprising means for receiving said impulses, means for converting the carrier frequency of said impulses to a given frequency, means for producing at least one repeat impulse for each of said converted impulses, means for delaying said repeat impulse for a given time interval, keying means, means keyed by said keying means to produce from said converted impulses, sub-impulses with intervals therebetween, means also keyed by said keying means to produce from said delayed repeat impulses, sub-impulses occurring during the intervals between the sub-impulses produced from said converted impulses and means for transmitting said keyed delayed repeat impulses to produce signals having characteristics simulating those which should be present in impulses reflected from said obstacles.

References Cited in the file of this patent

UNITED STATES PATENTS

| | | |
|---|---|---|
| 1,945,952 | Nicolson | Feb. 6, 1934 |
| 2,134,716 | Gunn | Nov. 1, 1938 |
| 2,252,083 | Luck | Aug. 12, 1941 |
| 2,276,497 | Kroger | Mar. 17, 1942 |